UNITED STATES PATENT OFFICE.

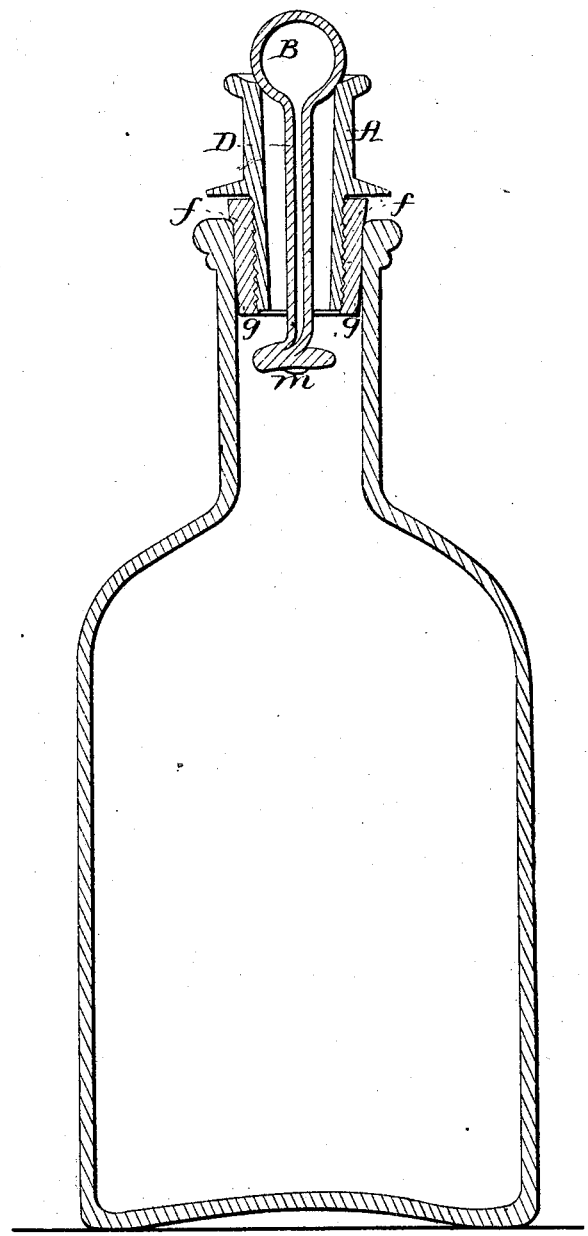

JNO. AUGUSTUS PRESTON, OF BOSTON, MASSACHUSETTS.

IMPROVEMENT IN BOTTLE-STOPPERS.

Specification forming part of Letters Patent No. 32,647, dated June 25, 1861.

*To all whom it may concern:*

Be it known that I, JOHN AUGUSTUS PRESTON, of Boston, in the county of Suffolk and State of Massachusetts, have invented a new and Improved Liquor-Stopper, of which the following is a full, clear, and exact description, reference being had to the accompanying drawing, making part of this specification, in which is represented a section through a bottle with my stopper applied.

My invention is in that class of stoppers which are self-opening and self-closing—that is, which open to permit the flow of the liquid when the bottle is inclined sufficiently, and which again close to exclude dust and insects when the bottle is again set upright. Stoppers of this class have been made in which a metallic valve attached to a rod has been used to close the orifice of a metallic mouth-piece. In other cases a glass ball has been suspended within a metallic mouth-piece by means of a wire; but all such stoppers are objectionable on account of their liability to corrode, and also on account of the difficulty of keeping them bright and clean.

To remedy this difficulty is the object of my present invention, in which the mouth-piece, valve, and valve-stem are all of glass, and may be instantly and easily cleansed by water, no part of the stopper being liable to corrode or to become tarnished from exposure or wear.

In the accompanying drawing, A is the mouth-piece, which is molded of glass, and has a screw, $f$, upon its lower portion, by means of which and a thin cylinder of cork, $g$, it is secured to the bottle or decanter. The valve B, with its stem D, is made of glass in the following manner: A ball, B, is blown upon the top of a glass rod, D, which is then inserted in the mouth-piece, the lower end being heated, so that it may be bent up, as at $m$, and prevented from falling out. The valve is thus held securely in place without the employment of wire or of any metal whatever to come in contact with the liquid.

In lieu of blowing the valve and stem out of a hollow rod, a glass ball and stem may be united by heating in a lamp or otherwise, and a short bar of glass may be in a similar manner attached to the opposite end of the stem, at $m$, as these details form no part of my invention.

What I claim as my invention, and desire to secure by Letters Patent, is—

A bottle-stopper made with its valve and valve-stem entirely of glass, as set forth, for the purpose specified.

JOHN AUGUSTUS PRESTON.

Witnesses:
SAM. COOPER,
EDMUND MASSON.